US006765486B2

(12) United States Patent
Roberts

(10) Patent No.: US 6,765,486 B2
(45) Date of Patent: Jul. 20, 2004

(54) PORTABLE ALARM SYSTEM THAT INTERFACES WITH AN INDIVIDUAL'S PERSONAL RADIO

(75) Inventor: Michael K. Roberts, Brighton, CO (US)

(73) Assignee: Millennium Sensor LLC, Laramie, WY (US)

( * ) Notice: Subject to any disclaimer, the term of this patent is extended or adjusted under 35 U.S.C. 154(b) by 0 days.

(21) Appl. No.: 10/249,983

(22) Filed: May 23, 2003

(65) Prior Publication Data

US 2003/0231110 A1 Dec. 18, 2003

Related U.S. Application Data

(63) Continuation of application No. 09/682,804, filed on Oct. 19, 2001, now abandoned.

(51) Int. Cl.[7] .......................... H04Q 7/00; H04B 1/38

(52) U.S. Cl. .......................... 340/539.11; 340/539.1; 455/228; 455/575.1; 455/569.1; 455/90.2; 381/122

(58) Field of Search .......................... 340/539.11, 539.1, 340/506, 531; 455/227, 228, 404, 567, 575.1, 569.1, 569.2, 90.1, 90.3; 381/122

(56) References Cited

U.S. PATENT DOCUMENTS

| | | | | |
|---|---|---|---|---|
| 4,665,385 | A | 5/1987 | Henderson | 340/539 |
| 5,159,315 | A | 10/1992 | Schultz et al. | 340/539 |
| 5,283,549 | A | 2/1994 | Mehaffey et al. | 340/521 |
| 6,028,514 | A | 2/2000 | Lemelson et al. | 340/539 |

OTHER PUBLICATIONS

Micro Technology Services, Inc., "The WAVE Portable Notification System", found at http://www.mitsi.com/security/PDF/TheWavePortable.pdf; May 23, 2003.

Lookout Portable Security, product literature for "The Dispatcher", "The Agent", "The Spy", and "Lookout DT", found at http://www.lookoutportablesecurity.com/products/products.htm, May 23, 2003.

Sensor Electronics Limited, "AutoGuard" and "StealthGuard" product information, found at http://www.sensorsecurity.com/index2.html, May 23, 2003.

*Primary Examiner*—Donnie L. Crosland
(74) *Attorney, Agent, or Firm*—Holland & Hart LLP; Christopher J. Kulish, Esq.

(57) ABSTRACT

Apparatus is directed to a personal, portable alarm system that interfaces with an individual's portable radio and remote speaker/microphone to provide the individual with an audible indication that a radio signal has been received from a remote sensor that is indicative of an event being detected adjacent to the location of the remote sensor.

16 Claims, 4 Drawing Sheets

PORTABLE ALARM SYSTEM THAT INTERFACES WITH AN INDIVIDUAL'S PERSONAL RADIO

CROSS REFERENCE TO RELATED APPLICATIONS

This application is a continuation of U.S. patent application Ser. No. 09/682,804, entitled "PORTABLE ALARM SYSTEM THAT INTERFACES WITH AN INDIVIDUAL'S PERSONAL RADIO," filed on Oct. 19, 2001 now abandoned.

FIELD OF THE INVENTION

The present invention is directed to a portable alarm system and, in particular, to an alarm system that interfaces with an individual's personal radio and remote speaker/microphone.

BACKGROUND OF THE INVENTION

A typical alarm system includes a sensor and an alarm indicator. The sensor operates to detect an event and produce a signal that is representative of the event having occurred. The alarm indicator receives the signal and, in response, causes an alarm to be produced that informs someone or something that the event has occurred. For example, one type of alarm system employs a sensor to detect the breaking of a glass window and to produce an electrical signal indicative of the breaking of the glass window. An alarm indicator processes the electrical signal in any number of ways. For instance, the electrical signal can be used to cause an audible alarm to sound, to telephone a police or security service and provide the relevant information, or to provide a visual indication on a computer/video monitor.

In one type of alarm system, the sensor operates to detect an event and if the event is detected, transmit a radio signal indicative of the event having occurred. A receiver that is tuned to the frequency of the signal produced by the transmitter operates to receive and process the signal to produced the desired alarm.

SUMMARY OF THE INVENTION

The present invention is directed to a personal, portable alarm system that interfaces with an individual's portable radio and at least a remote speaker, which is typically connected to the portable radio and takes the form of a headset or lapel/epaulet attachment, to provide the individual with an audible indication that a radio signal has been received from a remote sensor indicating that an event, such as motion, has been detected at the location of the sensor. Among the applications for the system are military applications that involve the establishment of defensive perimeters. The system is also useful in SWAT team applications where rooms in buildings are "cleared" by SWAT team members and there is a need to monitor the "cleared" rooms to determine if someone thereafter enters the rooms.

In many situations, individuals carry a portable radio that has a speaker interface that allows a remote speaker (i.e., a speaker that is spaced from the radio or not integrated into the radio housing) to be connected to the speaker channel of the radio. For example, many police and military forces employ a radio that includes a speaker jack receptacle for connecting the radio to a remote speaker device. The remote speaker device includes a speaker that is either in a headset that is positioned adjacent the individual's ear or attached to a piece of clothing that is adjacent the individual's ear. In addition, the remote speaker device includes a speaker jack that is adapted to mate with the speaker jack receptacle of the radio to connect the remote speaker device and the radio. When the remote speaker device and radio are connected to one another, via the speaker jack and speaker jack receptacle, the individual can hear communications that have been received by the radio in the remote speaker. In many cases, the remote speaker device is used in conjunction with a remote microphone that is positioned adjacent an individual's mouth and operates to convert the individual's oral communications into electrical signals for processing into a radio transmission.

The present invention is directed to a personal, portable alarm system that comprises a first interface for connecting to the speaker channel of a personal, portable radio, and a second interface for connecting to a remote speaker. Consequently, the system is positioned between the radio and the remote speaker. A speaker channel connects the first interface with the second interface. As such, when the system is connected to the radio and to the remote speaker, the individual is able to hear communications that have been received by their radio. The system further includes an alarm processing device that receives a sensor radio signal from a remotely located sensor that indicates that an event, such as motion, has been detected at the location of the sensor. It should be appreciated that the sensor radio signal is sufficiently different from the radio signals that the individual's personal, portable radio is designed to process so as not to interfere with the operation of the radio. The alarm processing device, in response to the sensor radio signal, produces an alarm signal that is interjected into the speaker channel for transmission to the remote speaker and informs the individual that a signal has been received from the remote sensor.

Another embodiment of the invention is directed to a personal, portable alarm system that includes a first interface for connecting to the speaker and microphone channels of an individual's portable radio, and a second interface for connecting to the individual's remote speaker-microphone. A communication channel connects the first and second interfaces. As such, when the system is connected to an individual's personal, portable radio and the remote speaker-microphone, the individual is able to hear communications that have been received by the radio and to have their oral communications conveyed to the radio for transmission. An alarm processing device operates to receive a sensor radio signal from a remotely located sensor, process the signal, and produce an alarm signal that is interjected into the communication channel for transmission to the remote speaker and informs the individual that a signal has been received from the remote sensor.

A further embodiment of the invention employs a processing device that not only interjects the alarm signal into the communication channel for transmission to the individual's remote speaker but also interjects the alarm signal into the communication channel for transmission to the microphone channel of the individual's personal, portable radio. Consequently, the alarm signal is not only heard by the individual with the system attached to their personal, portable radio but is also broadcast for others to hear. This allows the system to be attached to one individual's portable radio rather than having a system attached to the portable radios of all the individuals in a group that may need or want to be informed that a remote sensor had detected an event, such as motion.

Yet another embodiment of the invention includes a sensing device for detecting whether or not the speaker or communication channel is being utilized to convey a signal received by the individual's personal, portable radio or to convey a signal produced by the individual utilizing their remote microphone. Stated differently, the sensing device detects whether the radio and remote speaker or microphone are being utilized for communication with other radios. If the radio is being used to communicate, the sensing device produces a "hold" signal that is used by the processing device to hold any alarm signals that have not yet been interjected into the speaker or communication channel and any alarm signals that are received while the radio communication is occurring until the channel is clear, i.e., not otherwise being used to communicate over the radio.

In another embodiment, the "hold" signal serves as an interrupt signal to which the processing device responds by terminating any ongoing interjection of an alarm signal or signals into the speaker or communication channel. In addition, the processing device causes the alarm signals to be saved for later interjection into the speaker or communication channel.

Yet another embodiment of the invention allows the individual to define the content of the alarm signals. In one embodiment, the system is put in a mode that allows the individual to use a microphone associated with the individual's portable radio to enter a voice recording that is correlated to the remote sensor. Consequently, when the sensor radio signal is received by the system, the processing device causes the voice recording to be interjected into the speaker or communication channel. For example, the voice recording might be "motion at doorway #3" or simply "doorway #3". If several sensors are to be employed, the system is able to accommodate several such pre-recorded alarm messages.

In another embodiment, the processing device is capable of processing signals from several different sensors and interjecting a signal that is related to each sensor into the speaker or communication channel. To elaborate, in many applications, it is desirable to utilize a plurality of sensors, each at a different location. In this situation, the sensors each transmit a distinguishable or individualized signal. The processing device is capable of distinguishing these individualized signals from one another and then causing a signal to be interjected into the speaker or communication channel that identifies which one of the plurality of remote sensors has detected an event, such as motion.

Yet other embodiments of the system include remote sensors. One such remote sensor is a portable "trip wire" sensor that transmits a radio signal when someone or something passes between two, separated points that are connected by a "trip wire". In one embodiment, a portable, electromagnetic trip wire sensor is utilized that produces a radio signal when an electromagnetic beam, typically invisible, extending between an emitter and detector is broken by the passage of a person or object. Another portable remote sensor is a portable motion sensor that transmits a radio signal when motion is detected within a particular area.

DETAILED DESCRIPTION

Figure 1:
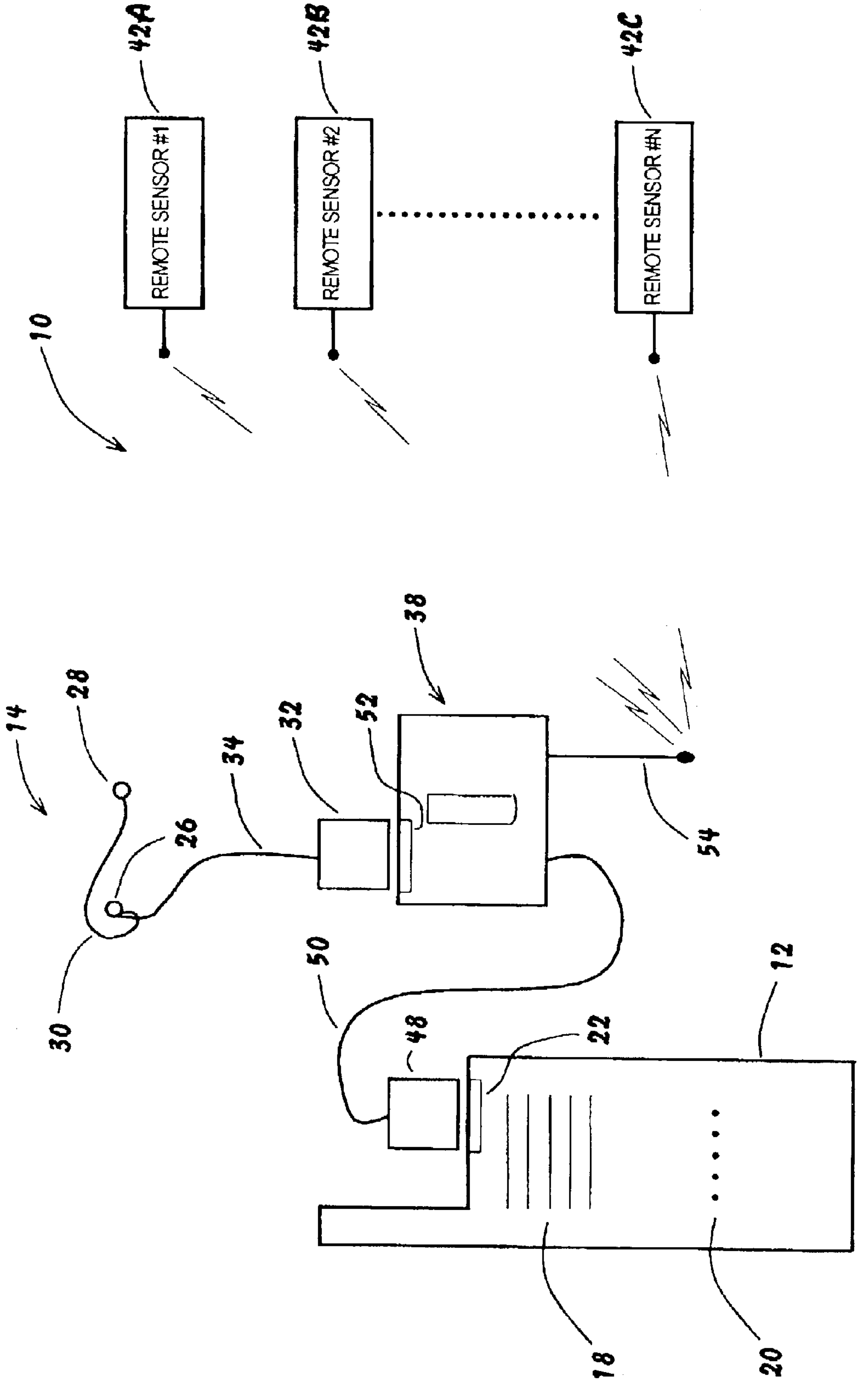
FIG. 1 is a block diagram of an embodiment of a portable alarm system that interfaces with an individual's personal, portable radio.

FIG. 1 illustrates an embodiment of a personal, portable alarm system 10 that interfaces with an individual's portable radio 12 and remote speaker-microphone setup, which takes the form of a headset 14. Before describing the system 10, the portable radio 12 and the headset 14 are described.

The portable radio 12 is of a size and weight that allows an individual to carry it on their person. Exemplary of this type of portable radio are the tactical radios utilized by police, security and military forces and commonly seen attached to a belt or bandolier. Typically, the portable radio 12 has an integrated speaker 18 for listening to communications received by the radio and an integrated microphone 20 that converts an individual's oral communications into electrical signals that contain information that is embodied in a radio signal transmitted by the radio 12. The radio 12 includes a remote interface 22 that allows a remote speaker-microphone setup, such as the headset 14, to be attached to the radio 12. The remote interface 22 commonly takes the form of a pair of jack receptacles, one jack receptacle for connecting to the speaker channel within the radio 12 and the other jack receptacle for connecting to the microphone channel within the radio 12. Other forms of interfaces are feasible. When a remote speaker-microphone set up is connected to the remote interface 22 of the radio 12, the operation of the integrated speaker 18 and the integrated microphone 20 are disabled in favor the remote speaker-microphone to prevent feedback problems. The radio 12 also typically includes other operator interface features (not shown) such as a "key" that allows the individual to place the radio in a transmit or receive mode of operation, a volume control, and a channel selector.

The headset 14 includes a remote speaker 26 and remote microphone 28. A structure 30 serves to respectively position the remote speaker and microphone 26, 28 adjacent an individual's ear and mouth when the headset 14 is in use. A headset plug 32 provides the mating interface to the remote interface 22. For instance, if the remote interface 22 is a pair of jack receptacles, the headset plug 32 includes two jacks that are suitable for insertion in the jack receptacles. Other types of interface structures that require a different type of plug are feasible. A cord 34 (commonly, a telephone cord) provides the electrical connections between the remote speaker and microphone 26, 28 and the plug 32. It should be appreciated that there are several types of remote speaker microphone structures, of which the headset 14 is only one example. Consequently, the invention is not restricted to use with any particular remote speaker-microphone setup or the interfaces used to connect such a setup to a radio.

Having described a typical portable radio and remote speaker-microphone setup, an embodiment of the system 10 is now described. Generally, the system 10 includes a portable receiver 38 that is capable of (a) interfacing with an individual's portable radio (such as radio 12) and remote speaker-microphone setup so as to have at least access to the communication channel to an individual's remote speaker and, in the illustrated embodiment, to the microphone channel within the radio; (b) receiving a radio signal from a remote sensor that is indicative of an event (e.g., motion) having occurred adjacent to the remote sensor; and (c) processing the radio signal such that an alarm signal is interjected into the communication channel going to the individual's remote speaker and, in the illustrated embodiment, into the microphone channel of the radio for broadcast to other radios.

In the illustrated embodiment, the system 10 further includes a portable remote sensor 42A that is of a size and weight that allows an individual to carry it on their person. Generally, the portable remote sensor is capable of sensing an event (such as motion) and after sensing the event, producing a radio signal for reception by the portable receiver 38 that is indicative of the occurrence of the event. In many applications, additional portable remote sensors 42B–42N are employed. It should be appreciated that the portable receiver 38 is also capable of being used in (a) an alarm system in which none of the remote sensors are considered to be portable, i.e., not of a size and weight that allows an individual to carry it on their person, and (b) an alarm system that employs a combination of portable and non-portable remote sensors. Further, while the portable sensors disclosed herein utilize electromagnetic motion detectors and electromagnetic (e.g., optical) "trip wires", it should be appreciated that other types of detectors or detection schemes can be employed in the sensors. For instance, temperature and pressure detectors are feasible, if required for a particular application. Detection schemes that utilize mechanical switches, such "foot" switches that are actuated when stepped on and "gate" switches that are actuated when a "gate" is moved one way or another by contact with a moving object, are also feasible.

Figure 2:
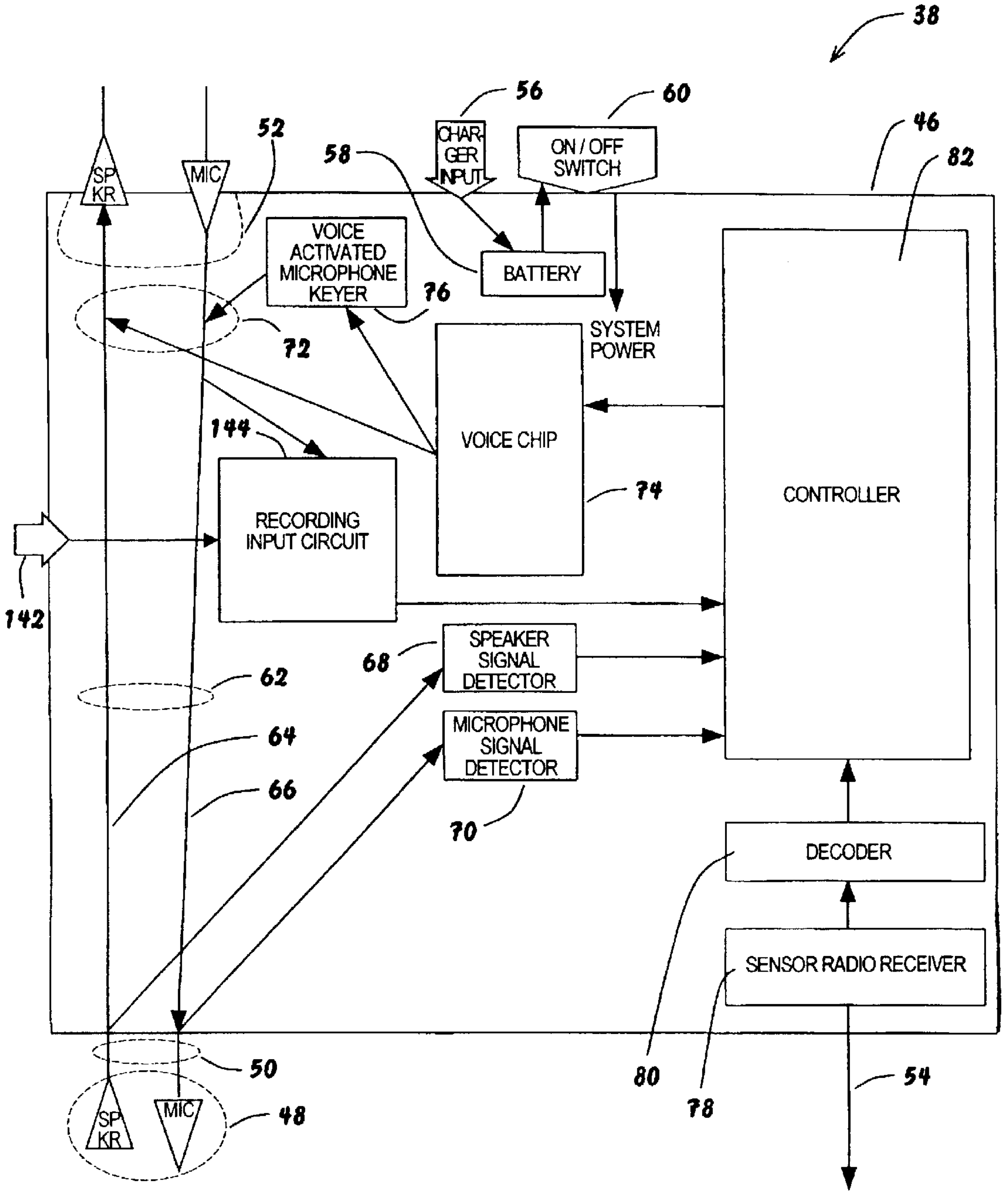
FIG. 2 is a block diagram of the portion of the portable alarm system that interfaces with an individual's personal, portable radio.

With reference to FIG. 2, an embodiment of the portable receiver 38 is described. The receiver 38 includes a housing 46. A plug 48 and cord 50 form an interface for establishing a connection with the radio 12 via the remote interface 22. When the plug 48 is connected to the remote interface 22, the receiver 38 has access to the speaker and microphone channels of the radio 12. A remote interface 52 is provided for establishing a connection with the individual's remote speaker-microphone setup, which is the headset 14 in the illustrated embodiment. An antenna 54 is provided for receiving radio signals from one or more remote sensors. While the antenna 52 is shown as extending from the housing 46, antennas that are located with the housing 46 or form part of the housing 46 are also feasible. A battery charger socket 56 is provided for charging an internal battery 58. An on/off switch 60 allows an individual to control the application of power from the internal battery 58 to other components of the receiver 38.

With continuing reference to FIG. 2, a communication channel 62 connects the interface formed by the plug 48 and cord 50 with the remote interface 52. Consequently, when the radio 12 and the headset 14 are both connected to the receiver 38, the communication channel 62 provides a path for communications received by the radio 12 to be conveyed to the remote speaker 26 and for an electrical signal representative of an oral communication made into the remote microphone 28 to be conveyed to the radio. 12 for processing into a radio transmission. The communication channel 62 includes speaker path 64 and a microphone path 66. Associated with the speaker path 64 is a speaker signal detector 68. A microphone "key" detector 70 is associated with the microphone path 64. The speaker signal detector 68 and microphone "key" detector 70 collectively operate to determine if the radio 12 is in use. The speaker signal detector 68 operates to determine if a communication received by the radio 12 is being conveyed to the remote speaker 26 and if such a communication is detected, output a signal indicative thereof (e.g., a "hold"/"interrupt" signal). After the communication terminates, the speaker signal detector 68 outputs a signal indicative thereof (e.g., removes a "hold"/"interrupt" signal). The microphone "key" detector 68 operates to determine if the "key" signals that are indicative of the period of time during which an individual is using the remote microphone 28 to cause an electrical signal to be conveyed to the radio 12 for processing into a transmission are present. Specifically, if the "key" signal that represents the beginning of an individuals use of the remote microphone 28 is detected, the microphone "key" detector 68 outputs a signal indicative thereof (e.g., a "hold"/"interrupt" signal). When the "key" signal that represents the end of the individual's use of the remote microphone 28 is detected, the microphone "key" detector 68 outputs a signal indicative thereof (e.g., removes a "hold"/"interrupt" signal). As an alternative to the microphone "key" detector 68, a microphone signal detector can be utilized that detects the presence of an electrical signal in the microphone path that is representative of an oral communication made into the remote microphone 28.

Also associated with the communication channel 62 is an interjection interface 72 that allows an alarm signal that is representative of an event at a remote sensor to be interjected onto the speaker path 64 for transmission to the remote speaker 26. The interjection interface 72 also allows an alarm signal to be interjected onto the microphone path 66 for conveyance to the radio 12 for broadcast. By interjecting the alarm signal onto the microphone path 66 for broadcast by the radio 12, it is only necessary for one member of a team to have the portable receiver 38. It should also be appreciated that it is feasible to interject the alarm signal only onto the speaker path 62. Such an embodiment would be adequate in applications when: (a) only one individual needs to hear an alarm signal, or (b) each member of a team has a portable receiver, thereby making the need to broadcast unnecessary.

A voice chip 74 is capable of retaining at least one alarm signal or message that is associated with the occurrence of an event at a remote sensor and interjecting the alarm signal into the communication channel 62 for transmission to the remote speaker 26 and for broadcasting by the radio 12. More typically, the voice chip 74 is capable of retaining multiple alarm signals or messages, each of which is associated with a different remote sensor and each capable of being selectively interjected into the communication channel 62. For instance, the voice chip 74 may contain the messages "sensor 1" and "sensor 2." When a radio signal is received from, for example, remote sensor 2, the voice chip 74 is instructed to provide the "sensor 2" message to the interjection interface 72. A voice activated microphone keyer 76 is disposed between the voice chip 74 and the portion of the interjection interface 72 that serves to interject any message onto the microphone path 74. The keyer 76 operates to produce "key" signals before and after the message has been interjected into the microphone path 64 that are interpreted by the radio 12 to switch the radio between transmit and receive modes, just as if the "key" on the radio 12 had been actuated. To elaborate, the keyer 76 interjects a "key" signal into the microphone path 66 that instructs the radio 12 to enter a transmit mode so that an alarm signal or message from the voice chip 74 that is to follow can be transmitted by the radio. After the alarm signal or message has been interjected into the microphone path 66, the keyer 76 interjects another "key" signal into the microphone path 66 that instructs the radio 12 to enter a receive mode so that communications from other radios can be received. As an alternative to the use of the keyer 76, a controller can be used to interject "key" signals in to the microphone path 66. For instance, the controller 82, which is described hereinbelow, is capable of being adapted to interject the noted "key" signals and thereby eliminate the need for the keyer 76.

With continuing reference to FIG. 2, the receiver further includes a sensor radio receiver 78 that detects and demodulates a radio signal that has been transmitted by a remote sensor and received by the antenna 54. The demodulated signal produced by the sensor radio receiver 78 is provided to a decoder 78 that determines a digital identification code that was carried by the radio signal from the remote sensor and identifies the remote sensor. It should be appreciated that if there is only a single remote sensor or if there are multiple remote sensors that each transmit the same signal, there is only a need to detect the signal received by the antenna 54. Further, if an identification code is needed, the identification code is not restricted to a digital code or any particular method or combination of methods for establishing the code.

The receiver 38 also includes a controller 82 that generally operates to: (a) not cause any alarm signals to be interjected into the communication channel 62; or (b) to cause alarm signals to be interjected into the communication channel 62 in response to a radio signal from a remote sensor that is indicative of an event occurring adjacent to the remote sensor. To elaborate, when the on/off switch 60 is in the "off" state, the controller 82 does not cause any alarm signals or messages stored in the voice chip 74 to be interjected into the communication channel 62. When the on/off switch 60 is in the "on" state, the controller 82 generally-operates to use the decoded digital signal that identifies the remote sensor that transmitted the radio signal and received by the antenna 54 to instruct the voice chip 74 to interject an alarm signal into the communication channel 62. However, the point in time at which the controller 82 instructs the voice chip 74 to interject an alarm signal depends upon the outputs of the speaker signal detector 68 and microphone "key" detector 70, which the controller 82 monitors. The controller 82 operates so as to give a preference to communications on the communication channel 62 that are from the radio 12 or as a result of the use of the remote microphone 28. Consequently, if the speaker signal detector 68 is not detecting any communications on the speaker path 64 from the radio 12 and the microphone "key" detector 70 is not detecting any "key" signals on the microphone path 66, the controller 82 operates to instruct the voice chip 74 to interject alarm signals or messages into the communication channel 62 for transmission to the individual's remote speaker 26 and for transmission to the radio 12 for broadcast. If either the speaker signal detector 68 detects a communication or the microphone "key" detector 70 detects a "key" signal indicative of the use or likely use of the microphone path 66, the response of the controller 82 depends upon whether or not the voice chip 74 is in the process of interjecting an alarm signal or message into the communication channel 62 or not. If the voice chip 74 is not interjecting an alarm signal into the communication channel 62 when either the speaker signal detector 68 detects a communication or the microphone "key" detector 70 detects a "key" signal indicative of the use or likely use of the microphone path 66, the controller 82 stores the information needed to cause any alarm signal or message that would have otherwise been interjected to be sent when the communication channel 62 clears. If several radio signals are received before the communication channel 62 clears, the controller 82 queues the information needed to cause the alarm signals or messages to be sent when the communication channel 62. If the voice chip 74 is interjecting an alarm signal or message into the communication channel 62 when either the speaker signal detector 68 or microphone "key" detector 70 makes a detection, the controller 82 operates to store the information needed to cause whatever alarm message was interrupted to be retransmitted after the channel clears. In addition, if other radio signals are received while the communication channel 62 is being used, the controller 82 queues the information needed to cause these alarm messages to be interjected into the communication channel 62 after the channel clears.

With continuing reference to FIG. 2, the receiver 38 also includes a record switch 142 that allows an individual to record a particular alarm signal or message in the voice chip 74 for a sensor via the remote microphone 28. The switch 142 includes a selector switch that can be set at an "off" position or at any one of a number of "on" positions, with each of the "on" positions corresponding to a separate sensor. The switch 142 also includes a default button/switch that if actuated when the selector switch is in one of the "on" positions, causes a default alarm signal or message stored in the voice chip 74 to be selected or preferred over any alarm signal or message that was previously recorded via the remote microphone 28. When the selector switch of the switch 142 is in an "on" position corresponding to a particular sensor and the default button/switch is not actuated, a recording input circuit 144 is activated that receives the alarm signal or message that an individual wants to record from the microphone path 66, which the alarm signal or message being established by the individual speaking into the remote microphone 28. The recording input circuit 144 communicates with the controller 82 to establish the "preferred" alarm signal or message in the voice chip 74 and establish the preferred alarm signal or message as the message that will be interjected into the communication channel 62 when a radio signal is received from the remote sensor to which the signal or message relates. One possible use of the preferred alarm signal or message is to provide information as to the specific location of the sensor with which the alarm or message is associated, while the default alarm signal or message does not include any such information. For example, if the default message is "sensor 3", a preferred alarm or message for sensor 3 could be "sensor at upstairs window".

In one embodiment, the housing of the portable receiver 38 is approximately 3.8" long, 2.4" wide, and 1" thick and the receiver 38 weighs approximately 6.75 ounces or 191.5 gm. Other implementations of the portable receiver may have different dimensions and/or a different weight and still be considered portable, i.e., be of a size and weight that allows an individual to carry it on their person.

It should be appreciated that the portable receiver 38 could be integrated, if desired, into a portable radio, such as radio 12. In such an embodiment the remote interface 52 would replace the remote interface 22 and the connection interface formed by remote interface 22 and plug 48 would replaced by electrical conductors or otherwise rendered unnecessary.

Figure 3:
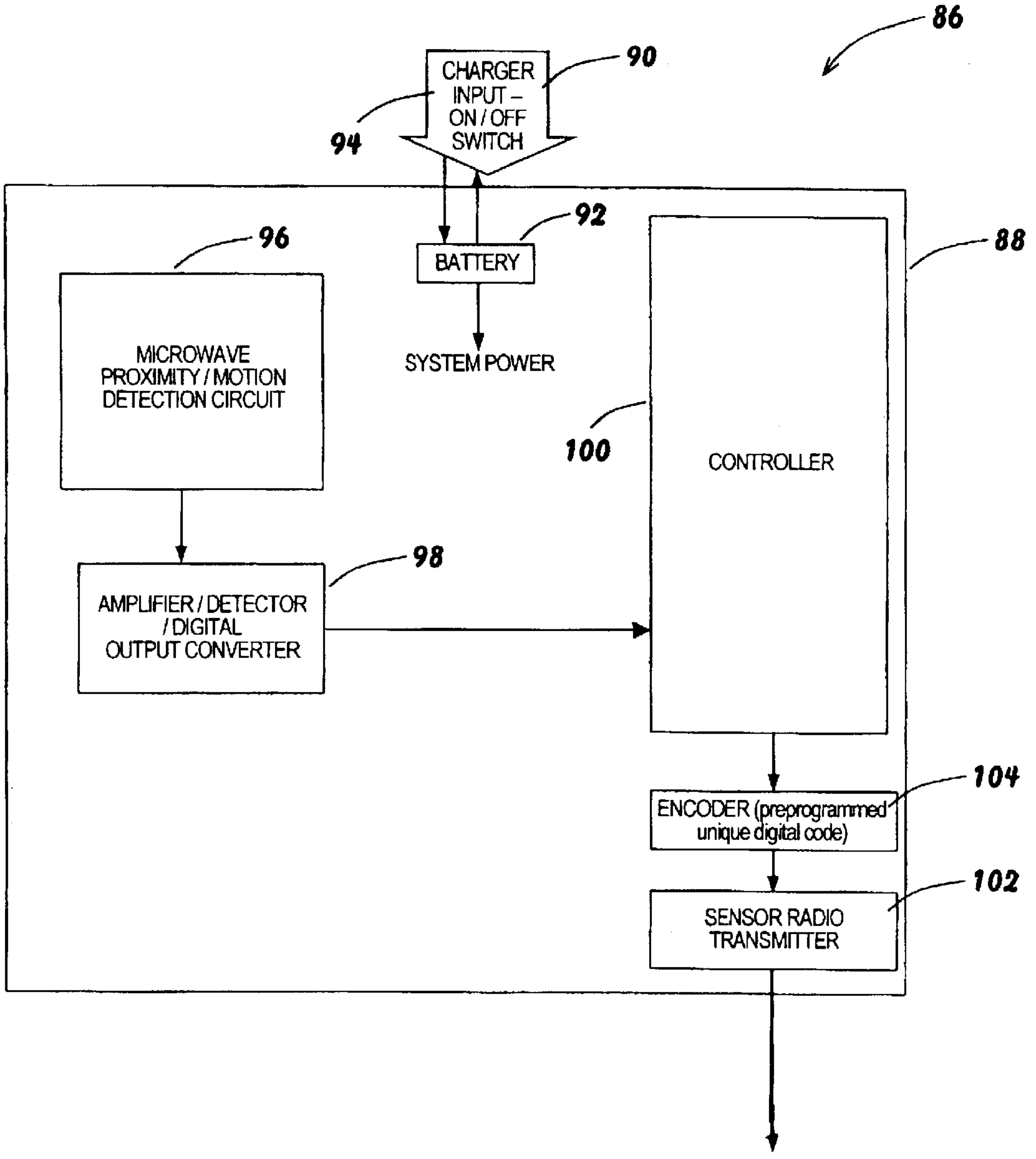
FIG. 3 is block diagram of a portable, motion sensor.

With reference to FIG. 3, an embodiment of a portable motion sensor 86 that is suitable for use in the system 10 is described. The portable motion sensor 86 includes a hermetically sealed housing or package 88. A battery charger input 90 is provided for charging an internal battery 92. An on/off switch 94 allows an individual to control the application of power from the internal battery 92 to other components of the sensor 86. A microwave proximity/motion detection circuit/antenna 96 operates to emit microwaves in an area surrounding the sensor and receive the reflected microwaves from objects in the area or that enter the area. An amplifier/detector/A-to-D converter circuit 98 operates to detect a reflected signal, amplify any reflected microwave signals, and convert the amplified signal into a digital signal. A controller 100 operates to receive any digital signal produced by the circuit 98 and analyze the digital signal to determine if there is a Doppler shift in the signal that is indicative of someone or something having moved in the area surrounding the sensor. If the controller 100 determines that no motion is occurring in the area, no further action takes place. If, however, the controller 100 determines that motion has occurred in the area of the sensor, the controller 100 activates a radio transmitter 102 and encoder 104. The encoder 104 outputs a signal that identifies the sensor and modulates the carrier signal output by the transmitter 102. Consequently, the transmitter 102 outputs a radio signal that both indicates that a "motion" event has occurred in the area adjacent to the sensor and identifies the sensor. If the application does not require that an id be associated with the sensor, the encoder 104 can be eliminated or by-passed. The signal produced by the transmitter 104 is applied to an antenna 106 that extends from the housing 88. Antennas that are internal to or part of the housing 88 are feasible.

The portable motion sensor 86 is approximately 1.5" wide, 4" long and 1"–1.4" thick, depending on the type of internal battery employed. The sensor 86 weighs approximately 0.13 ounces or 3.7 gm. Other implementations of a portable motion sensor may have different dimensions and/or a different weight and still be considered portable, i.e., be of a size and weight that allows an individual to carry it on their person.

Figure 4:
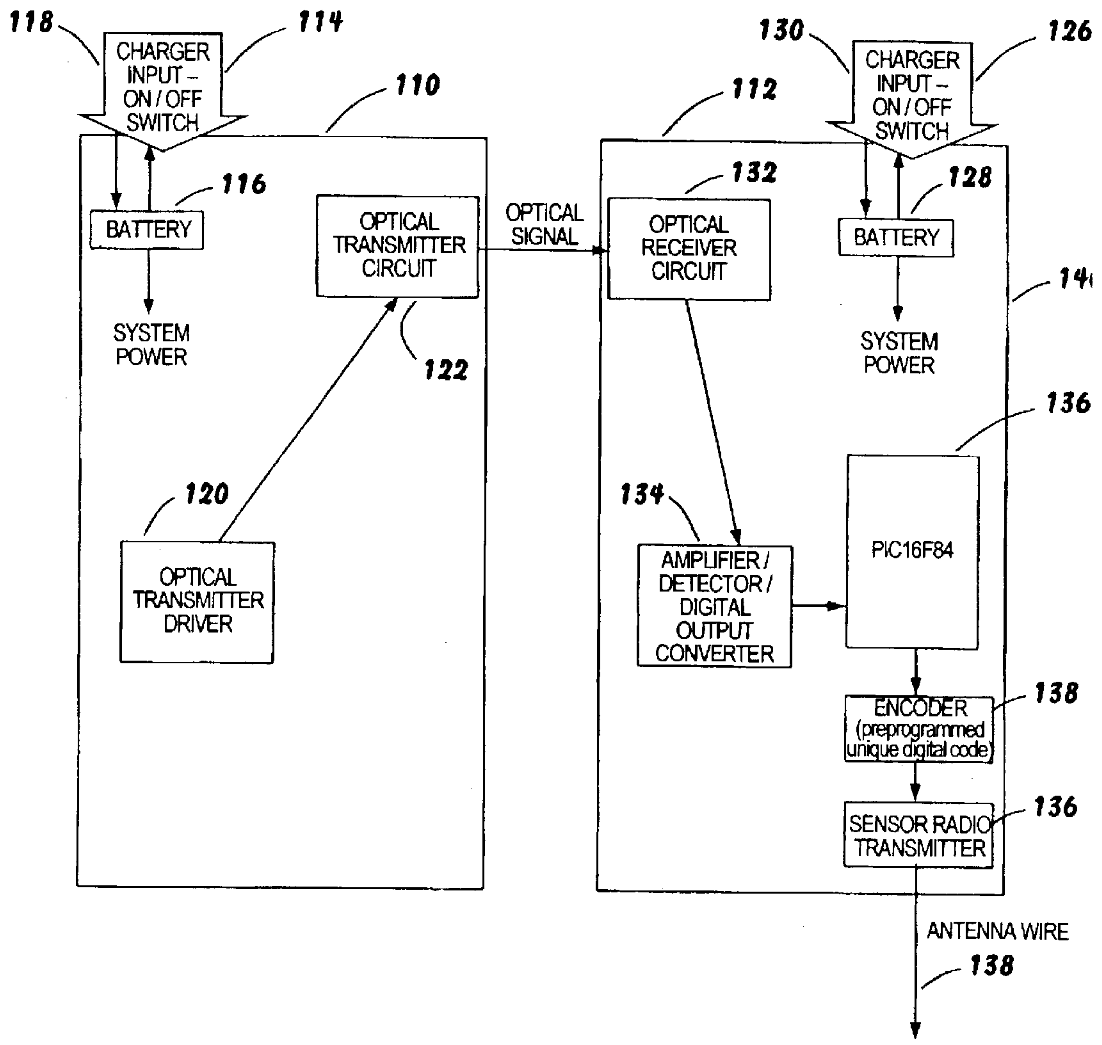
FIG. 4 is a block diagram of a portable, optical "trip wire" sensor.
Figure 4:
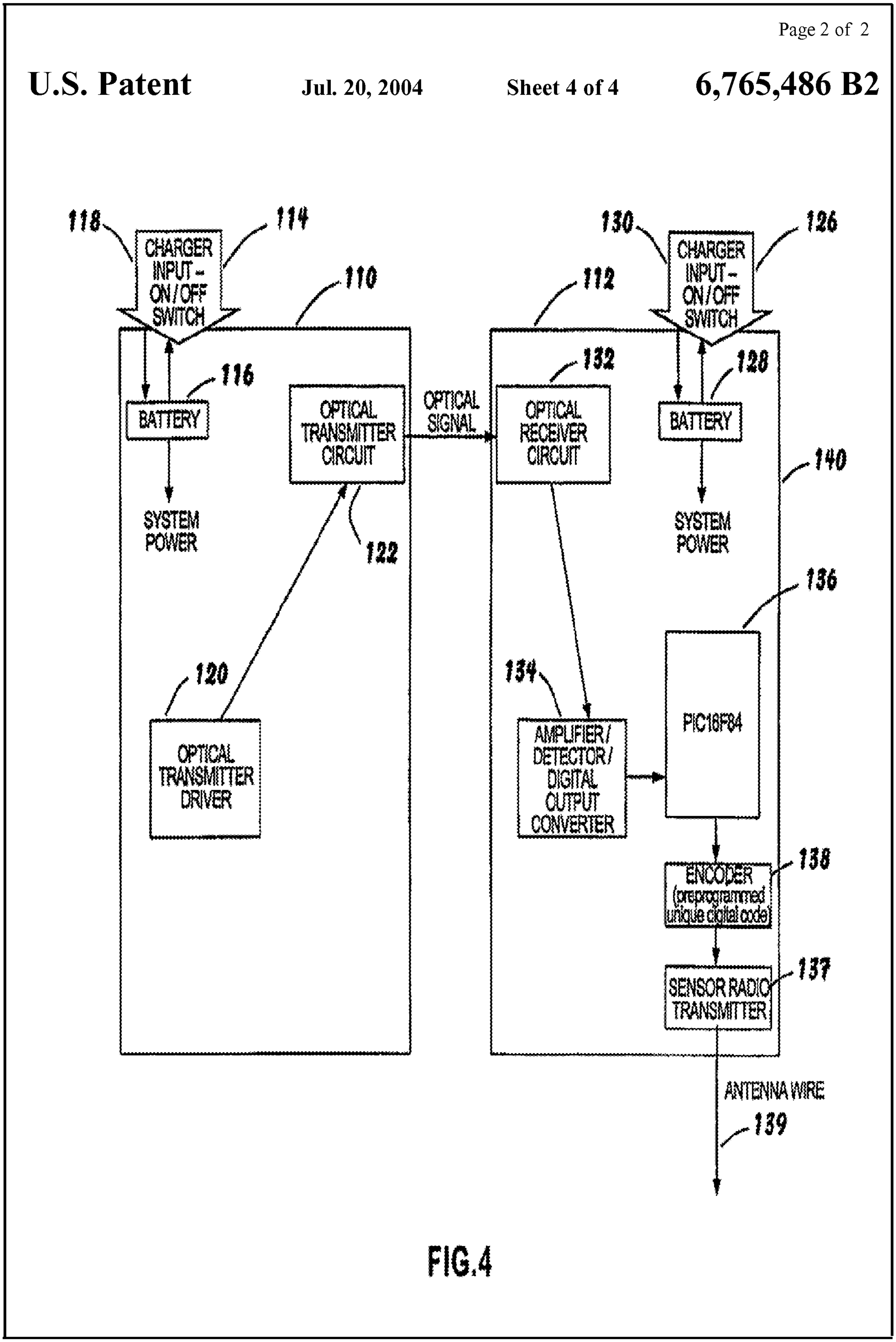

With reference to FIG. 4, an embodiment of a portable, electromagnetic "trip wire" sensor 108 that is suitable for use in the system 10 is described. Generally, a "trip wire" sensor serves to indicate whether someone or something has crossed a specific line. The line typically extends across a doorway or path but can also be arbitrary. The sensor 108 includes a transmitter 110 for producing a beam of light and a receiver 112 for receiving the beam of light and if an interruption is detected in the beam of light that is indicative of someone or something having passed through a line extending between transmitter 110 and receiver 112, cause a radio signal to be generated. The transmitter 110 includes battery charger input 114 for charging an internal battery 116. An on/off switch 118 allows an individual to control the application of power from the internal battery 116 to other components of the transmitter 110. An optical transmitter driver 120 produces a signal when the transmitter is active that causes an optical transmitter circuit 122 to produce a beam of light. Typically, a relatively wide beam of light is produced to simplify alignment of the transmitter 110 with the receiver 112.

The receiver 112 includes battery charger input 126 for charging an internal battery 128. An on/off switch 130 allows an individual to control the application of power from the internal battery 128 to other components of the receiver 112. An optical receiver circuit 132 operates to produce an electrical signal that is representative of whatever optical signal is received. Consequently, if the optical receiver circuit 132 receives the light beam output by the transmitter 110, the circuit 132 produces a representative electrical signal. If the light beam produced by the transmitter 110 does not reach the receiver 112, due to the passage of someone or something between the transmitter 110 and the receiver 112, the circuit 132 produces a representative electrical signal that is distinguishable from the signal produced when the light beam produced by the transmitter 110 is received. An amplifier/detector/A-to-D converter circuit 132 operates to detect the signal output by the circuit 132I, amplify any detected signal, and convert the amplified signal into a digital signal. A controller 136 operates to receive any digital signal produced by the circuit 134 and analyze the digital signal to determine if the signal indicates that someone or something passed between the transmitter 110 and receiver 112. If the controller 136 determines that no such passage has occurred, no further action takes place. If, however, the controller 136 determines that such a passage has occurred, the controller 136 activates a radio transmitter 136 and encoder 138. The encoder 138 outputs a signal that identifies the sensor and modulates the carrier signal output by the transmitter 136. Consequently, the transmitter 136 outputs a radio signal that both indicates that a "passage" event has occurred and identifies the sensor. If the application does not require that an id be associated with the sensor, the encoder 138 can be eliminated or bypassed. The signal produced by the transmitter 136 is applied to an antenna 138 that extends from a housing 140. Antennas that are internal to or part of the housing 140 are feasible.

The transmitter 110 and receiver 112 of the portable, electromagnetic "trip wire" sensor 108 are each approximately 1.375" wide, 2.125" long and 0.625" thick. The total weight of the portable, optical "trip wire" sensor 108 is approximately 7.9 oz. or 224.3 gm. Other implementations of a portable, electromagnetic "trip wire" sensor may have transmitters and receivers with different dimensions and/or a different weights and still be considered portable, i.e., be of a size and weight that allows an individual to carry it on their person.

The operation of the system 10 is now described regardless of the type of remote sensor employed and assuming that multiple remote sensors that each produce a radio signal when an event of some type has been detected have been deployed. The portable receiver 38 is attached to the individual's portable radio 12 using the remote interface 22 of the radio 12 and the plug 48 or other interface that mates with the remote interface 22. The portable receiver 38 is also attached to the remote speaker-microphone setup using the remote interface 52 of the receiver 38 and the plug 32 or other interface that mates with the remote interface 52. With the on/off switch 60 of the receiver 38 in the "off" position, an individual is able to hear communication received by the radio 12 via the remote speaker 26 and to use the remote microphone 28 to transmit communications via the radio 12. When the on/off switch 60 of the receiver 38 is placed in the "on" position, an individual is able to conduct the same communications as when the on/off switch 60 was in the "off" position. Additionally, however, the individual is able to hear, via the remote speaker 26, any alarm signal or message produced by the receiver 38 when a radio signal from a remote sensor is received. The alarm signal or message is also conveyed to the radio 12 for broadcasting to other radios. The interjection of alarm signals or messages into the communication channel 62 for conveyance to the remote speaker 26 and to the radio 12 is delayed by the receiver 38 if the communication channel 62 is otherwise being used. Further, the interjection of alarm signals or messages into the communication channel 62 is interrupted when the signals initiating from the radio 12 or the remote microphone 28 are detected. Information relating to the interrupted alarm signal is stored so that the alarm signal or message, in its entirety, can be interjected into the communication channel when the channel becomes clear. If additional radio signals are received when an alarm message is delayed or interrupted, the information necessary to produce each of the relevant alarm signal or message is queued and used to generate the alarm signals or messages for interjection into the communication channel 62 after the channel 62 clears.

Typically, the receiver 38 is used in conjunction with multiple remote sensors that each produce a radio signal when an event has been detected that contains information which identifies the sensor. The receiver 38 recovers this information from the received radio signal and uses this information to produce an alarm signal that is unique to the sensor that transmitted the radio signal. For instance, the receiver 28 may interject a signal into the communication channel that is heard on the remote speaker 26 as, for example, "sensor 2." Typically, the individual hearing this message on their remote speaker 26 correlates the message with the known position of sensor 2 and can take appropriate action.

The embodiment described hereinabove is intended to explain the best mode known of practicing the invention and to enable others skilled in the art to utilize the invention.

What is claimed is:

1. A personal, portable alarm system comprising:

a housing;

a first interface, operatively associated with said housing, for providing connections to speaker and microphone channels of an individual's portable radio;

a second interface, operatively associated with said housing, for providing connections to an individual's remote speaker and a remote microphone;

a communication channel, located within said housing, that connects said first interface with said second interface so that when the individual's portable radio is active, the individual is able to hear communications received by the portable radio on the individual's remote speaker and to have oral communications that are spoken into the individual's remote microphone conveyed to the portable radio for transmission; and alarm processing means, substantially located within said housing, for receiving a sensor radio signal from a remote sensor that indicates that an event has occurred adjacent to the location of the remote sensor, processing said sensor radio signal, and interjecting an alarm signal into said communication channel for transmission to an individual's remote speaker to audibly inform the individual that an event has occurred adjacent to the location of the remote sensor.

2. A personal, portable alarm system, as claimed in claim 1, wherein:

said alarm processing means also interjects said alarm signal into said communication channel for transmission to the microphone channel of the individual's portable radio for broadcast to other radios that are tuned to receive signals from the individual's portable radio.

3. A personal, portable alarm system, as claimed in claim 1, wherein:

said alarm processing means includes means for detecting if a signal initiating from one of an individual's remote microphone and an individual's portable radio is being conveyed over said communication channel.

4. A personal, portable alarm system, as claimed in claim 3, wherein:

said alarm processing means includes means for storing-an alarm signal if said means for detecting has detected a signal being conveyed over said communication channel.

5. A personal, portable alarm system, as claimed in claim 4, wherein:

said alarm processing means includes means for causing alarm signal information retained in said means for storing to be interjected into said communication channel after said means for detecting no longer detects a signal on said communication channel.

6. A personal, portable alarm system, as claimed in claim 1, wherein:

said alarm processing means includes means stopping the interjection of an alarm signal into said communication channel if said mean for detecting identifies a signal that is being received at either said first interface or said second interface.

7. A personal, portable alarm system, as claimed in claim 1, wherein:

said alarm processing means includes means for allowing an individual to record an alarm message for a particular sensor.

8. A personal, portable alarm system comprising:

a housing;

a first interface, operatively associated with said housing, for connecting to a speaker channel of an individual's portable radio;

a second interface, operatively associated with said housing, for connecting to an individual's remote speaker;

a speaker channel, located within said housing, that connects said first interface with said second interface so that when the individual's portable radio is active, the individual is able to hear communications received by the individual's portable radio on the individual's remote speaker; and alarm processing means, substantially located within said housing, for receiving a sensor radio signal from a remote sensor that indicates that an event has occurred adjacent to the location of the remote sensor, processing said sensor radio signal, and interjecting a signal into said speaker channel for transmission to the individual individual's remote speaker to audibly inform the individual that an event has occurred adjacent to the location of the remote sensor.

9. A personal, portable alarm system, as claimed in claim 8, wherein:

said housing is about 3.8" long, about 2.4" wide, and 1" thick.

10. A personal, portable alarm system, as claimed in claim 8, wherein:

said housing and any elements contained in said housing weigh than about 200 gm.

11. A personal, portable alarm system, as claimed in claim 8, further comprising:

a portable, trip wire sensor.

12. A personal, portable alarm system, as claimed in claim 11, wherein:

said portable, trip wire sensor is a portable, electromagnetic trip wire sensor.

13. A personal, portable alarm system, as claimed in claim 11, wherein:

said portable, trip wire sensor weighs less than about 250 gm.

14. A personal, portable alarm system, as claimed in claim 8, further comprising:

a portable motion sensor.

15. A personal, portable alarm system, as claimed in claim 14, wherein:

said portable motion sensor is about 1.5" wide, about 4" long, and about 1" thick.

16. A personal, portable alarm system, as claimed in claim 15, wherein:

said portable motion sensor weighs less than about 4 gm.

* * * * *

UNITED STATES PATENT AND TRADEMARK OFFICE

CERTIFICATE OF CORRECTION

PATENT NO. : 6,765,486 B2
DATED : July 20, 2004
INVENTOR(S) : Roberts

It is certified that error appears in the above-identified patent and that said Letters Patent is hereby corrected as shown below:

Column 4,
Lines 45-46, delete “speaker microphone”, and insert -- speaker-microphone --;

Column 5,
Line 50, delete “radio. 12”, and insert -- radio 12 --;

Column 7,
Line 23, delete “generally-operates”, and insert -- generally operates --;

Column 11,
Lines 57-58, delete “storing-an”, and insert -- storing an --.

Signed and Sealed this

Seventh Day of December, 2004

JON W. DUDAS
*Director of the United States Patent and Trademark Office*

UNITED STATES PATENT AND TRADEMARK OFFICE

CERTIFICATE OF CORRECTION

PATENT NO. : 6,765,486 B2
APPLICATION NO. : 10/249983
DATED : July 20, 2004
INVENTOR(S) : Roberts It is certified that error appears in the above-identified patent and that said Letters Patent is hereby corrected as shown below:

Column 7, line 4, delete “decoder 78”, and insert --decoder 80--;
Column 9, lines 62-63, delete “amplifier/detector/A-to-D converter circuit 132”, and insert --amplifier/detector/A-to-D converter circuit 134--;
Column 9, lines 63-64, delete “circuit 1321”, and insert --circuit 132--;
Column 11, line 6, delete “receiver 28”, and insert --receiver 38--;
Column 10, lines 5-6, delete “transmitter 136”, and insert--transmitter 137--;
Column 10, lines 8, delete “by the transmitter 136”, and insert --by the transmitter 137--;
Column 10, lines 8-9, delete “transmitter 136 outputs”, and insert --transmitter 137 outputs--;
Column 10, lines 13, delete “transmitter 136”, and insert --transmitter 137--; and
Column 10, lines 13, delete “antenna 138”, and insert--antenna 139--.
Delete drawing sheet A, consisting of Fig. 4, and replace with drawing sheet 4, consisting of Fig. A. (Attached)

Signed and Sealed this

Sixth Day of March, 2007

JON W. DUDAS
*Director of the United States Patent and Trademark Office*